United States Patent
Lutz

(10) Patent No.: US 10,019,231 B2
(45) Date of Patent: Jul. 10, 2018

(54) APPARATUS AND METHOD FOR FIXED POINT TO FLOATING POINT CONVERSION AND NEGATIVE POWER OF TWO DETECTOR

(71) Applicant: ARM LIMITED, Cambridge (GB)

(72) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 11 days.

(21) Appl. No.: 15/242,782

(22) Filed: Aug. 22, 2016

(65) Prior Publication Data

US 2018/0052660 A1   Feb. 22, 2018

(51) Int. Cl.
  *G06F 9/30*   (2018.01)
  *G06F 7/483*   (2006.01)

(52) U.S. Cl.
  CPC .................................... *G06F 7/483* (2013.01)

(58) Field of Classification Search
  None
  See application file for complete search history.

(56) References Cited

U.S. PATENT DOCUMENTS

| | | | | |
|---|---|---|---|---|
| 6,341,300 | B1* | 1/2002 | Shankar | G06F 1/0356 708/500 |
| 9,766,857 | B2* | 9/2017 | Lutz | G06F 7/483 |
| 9,766,858 | B2* | 9/2017 | Lutz | G06F 7/483 |
| 9,778,906 | B2* | 10/2017 | Lutz | G06F 7/483 |
| 2016/0092169 | A1* | 3/2016 | Lutz | G06F 7/485 708/205 |
| 2016/0126975 | A1* | 5/2016 | Lutz | G06F 7/483 708/204 |
| 2018/0052660 | A1* | 2/2018 | Lutz | G06F 7/483 |

\* cited by examiner

*Primary Examiner* — David H Malzahn
(74) *Attorney, Agent, or Firm* — Nixon & Vanderhye P.C.

(57) ABSTRACT

A data processing system 2 supports conversion of fixed point numbers to floating point numbers. The result floating point numbers may be subnormal. A first shifter 28 shifts input signals representing the fixed point number by a first shift amount depending upon a leading zero count within an integer portion followed by a fractional portion of the fixed point number. A second shifter 30 shifts the input signals by a second shift amount depending upon the variable point position within the fixed point number. A subnormal result detector 34 generates a selection signal in dependence upon detection of a combination of a variable point position and the count of leading zeros which corresponds to the floating point number having a subnormal value. Selection circuitry 32 selects one of the outputs from the first shifter or the second shifter to form the significand in dependence upon the selection signal generated by the subnormal result detector.

15 Claims, 4 Drawing Sheets

Figure 1:
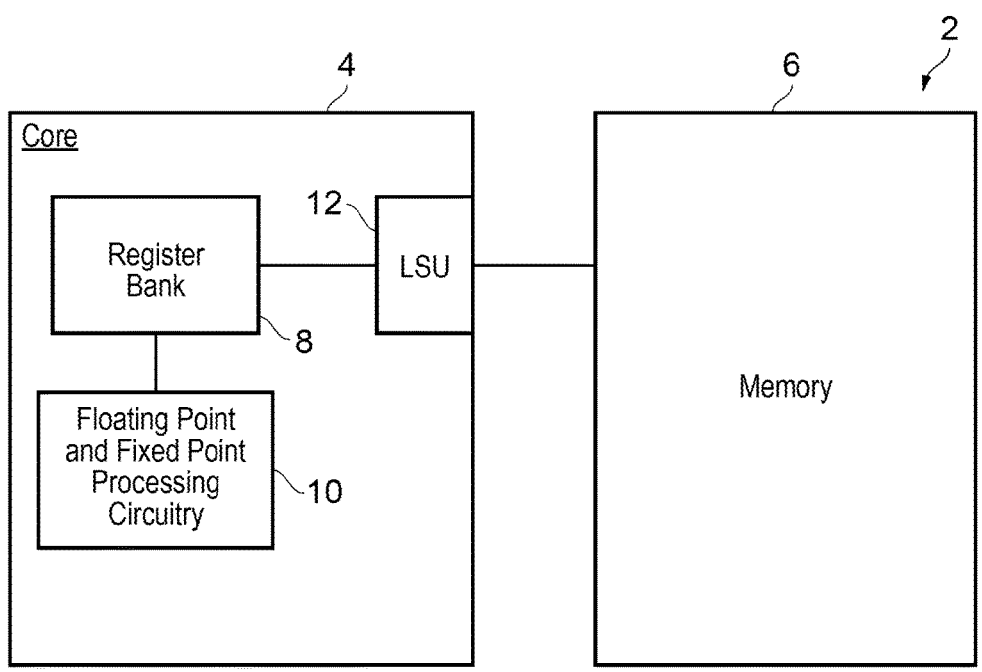

APPARATUS AND METHOD FOR FIXED POINT TO FLOATING POINT CONVERSION AND NEGATIVE POWER OF TWO DETECTOR

BACKGROUND

Field

This disclosure relates to the field of data processing systems. More particularly, this disclosure relates to data processing systems that convert fixed point numbers to floating point numbers.

Description

It is known to provide data processing systems with circuitry able to process fixed point numbers with an integer portion, a variable point position and a fractional portion as well as floating point numbers having an exponent and significand. It is further known within such systems to provide mechanisms for converting between fixed point numbers and floating point numbers.

SUMMARY

At least some embodiments of the present disclosure provide apparatus for converting input signals representing a fixed point number with an integer portion, a fractional portion and a variable point position to output signals representing a floating point number having an exponent and a significand, said apparatus comprising:

a first shifter to shift said input signals by a first shift amount dependent upon a count of leading zeros within said integer portion followed by said fractional portion and independent of said variable point position to generate a first shifted output;

a second shifter to shift said input signals by a second shift amount dependent upon said variable point position and independent of said count of leading zeros to generate a second shifted output;

a subnormal result detector to generate a selection signal in dependence upon detection of a combination of said variable point position and said count of leading zeros that corresponds to said floating point number having a subnormal value; and selection circuitry to select one of said first shifted output and said second shifted output be used to form said significand in dependence upon said selection signal.

At least some embodiments of the present disclosure provide a method of converting input signals representing a fixed point number with an integer portion, a fractional portion and a variable point position to output signals representing a floating point number having an exponent and a significand, said method comprising:

shifting said input signals by a first shift amount dependent upon a count of leading zeros within said integer portion followed by said fractional portion and independent of said variable point position to generate a first shifted output;

shifting said input signals by a second shift amount dependent upon said variable point position and independent of said count of leading zeros to generate a second shifted output;

generating a selection signal in dependence upon detection of a combination of said variable point position and said count of leading zeros that corresponds to said floating point number having a subnormal value; and selecting one of said first shifted output and said second shifted output be used to form said significand in dependence upon said selection signal.

At least some embodiments of the present disclosure provide apparatus for detecting input signals representing a two's complement number that is a negative power of two, said apparatus comprising:

an input value shifter to form a left shifted input value by left shifting said input value by one bit position toward a most significant bit position of said input value;

an inverter to bitwise invert one of said input value and said left shifted input value to generate an inverted value;

bitwise logical combination circuit to perform a logical combination corresponding to a bitwise logical combination of another of said input value and said left shifted input value with said inverted value to generate a logical combination value; and single bit value detecting circuitry to detect said input value as representing a negative power of two when said logical combination value contains a single instance of a predetermined bit value.

Figure 2:
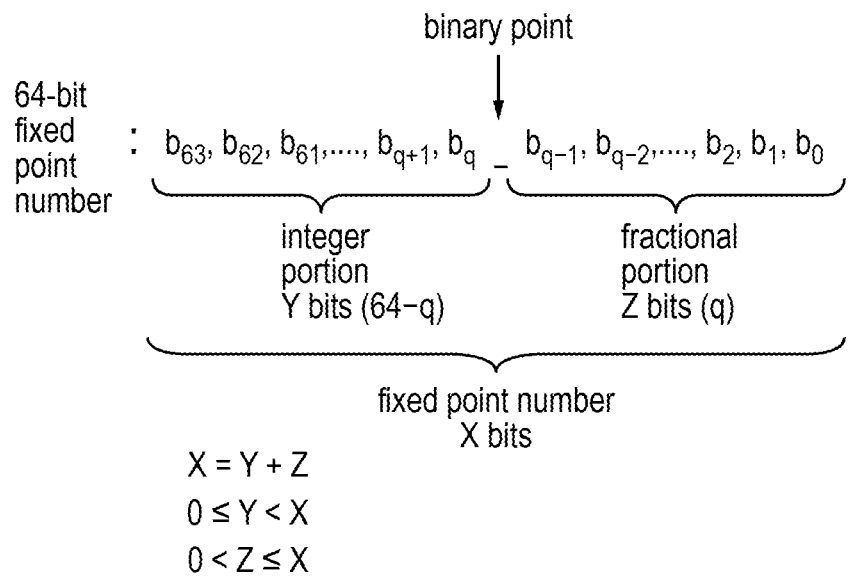
Figure 3:
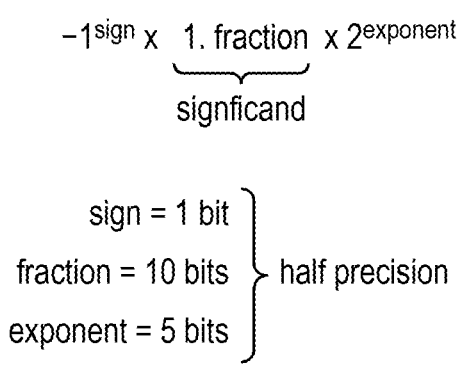
Figure 4:
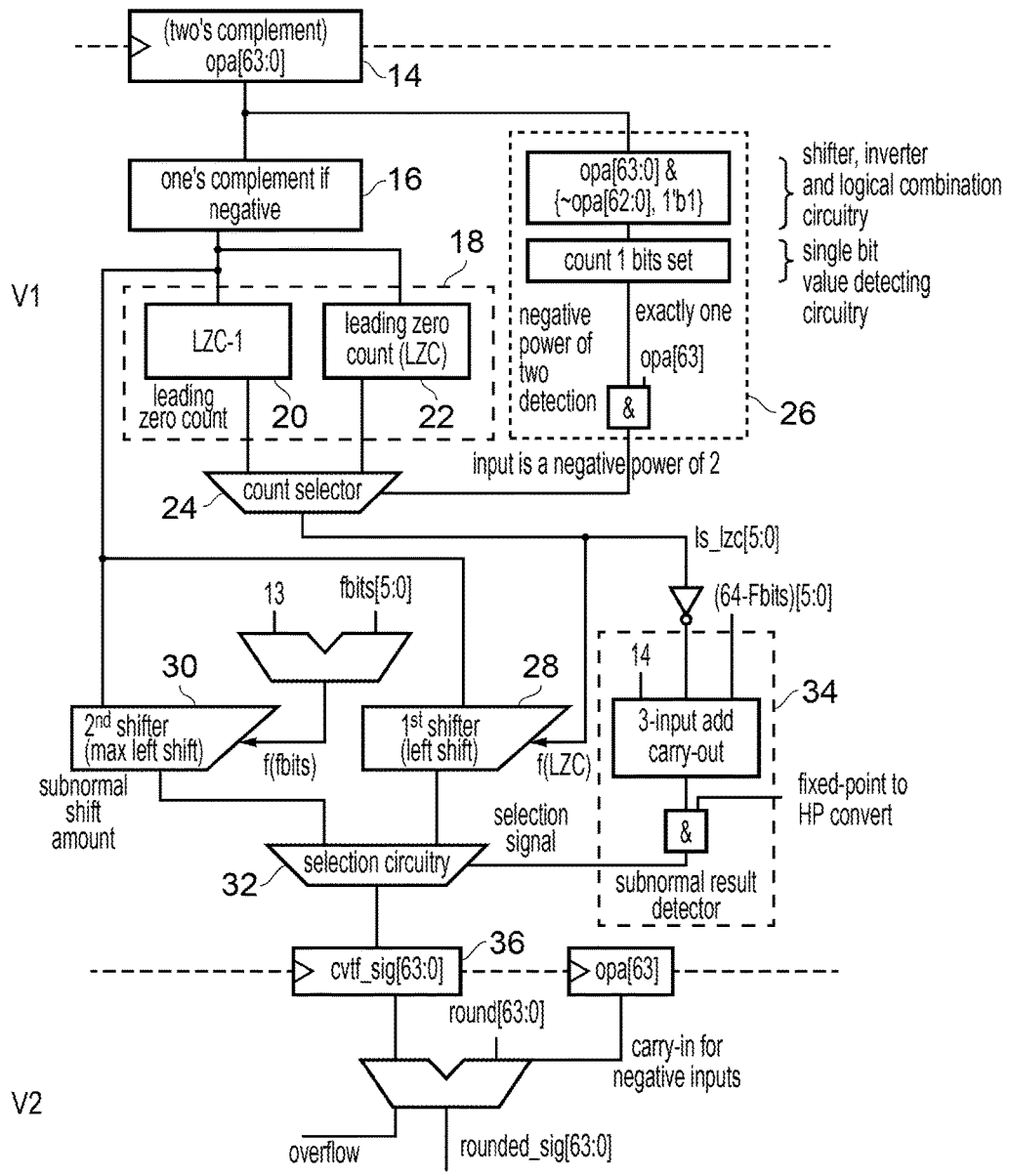
Figure 5:
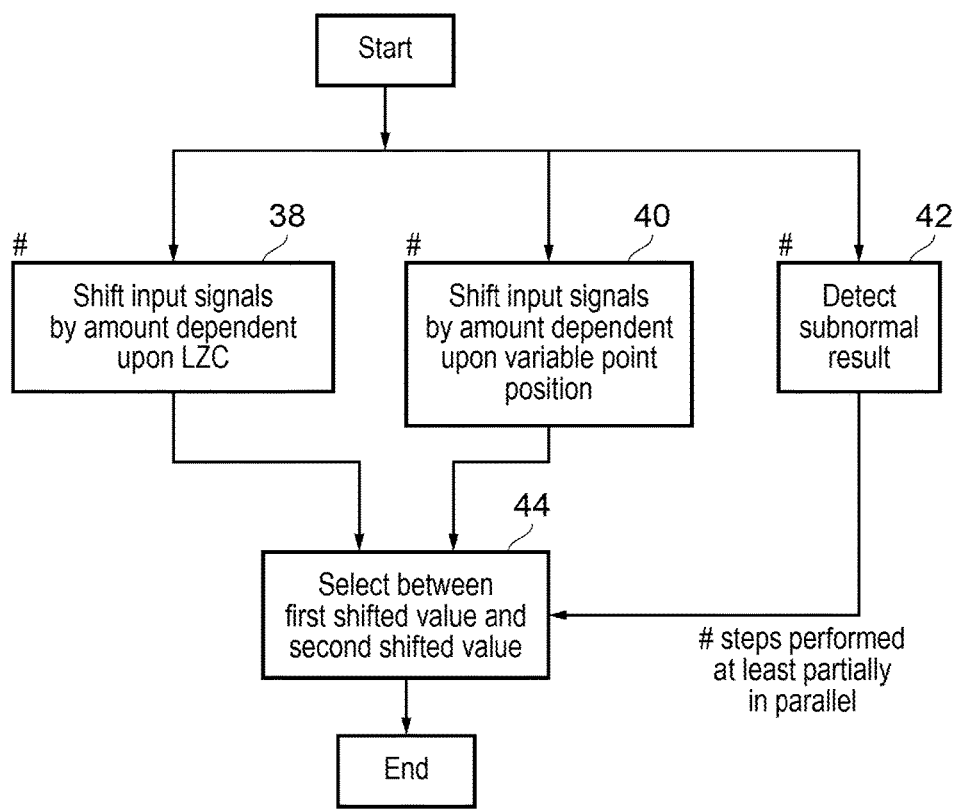

Example embodiments will now be described, by way of example only, with reference to the accompanying drawings in which:

FIG. 1 schematically illustrates a data processing system including circuitry for manipulating and converting between fixed point numbers and floating point numbers;

FIG. 2 schematically illustrates a fixed point number;

FIG. 3 schematically illustrates a floating point number;

FIG. 4 schematically illustrates a significand path within circuitry for converting from a fixed point number to a floating point number; and FIG. 5 is a flow diagram schematically illustrating the operation of a portion of the circuitry of FIG. 4.

EMBODIMENTS

Floating-point (FP) is a useful way of approximating real numbers using a small number of bits. The IEEE 754-2008 FP standard proposes multiple different formats for FP numbers, but the ones that ARM is concerned with are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above. SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1.fraction is called the significand, and the 1 is not stored as pan of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
| --- | --- | --- | --- | --- |
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | -infinity |
| 0 | 11111 | 00_1111_0011 | | NaN |

A large part of the complexity of FP implementation is due to subnormals, therefore they are often handled by microcode or software. All recent ARM parts (anything with Cortex in the name) handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001
−1=1001

In two's complement representation, an n-bit integer i is represented by the low order n bits of the binary n+1-bit value $2^n + i$, so a 4-bit two's complement integer would represent plus and minus one as:

+1=0001
−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are of interest to ARM. These six are:

| mode | | definition |
| --- | --- | --- |
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value

G—(guard) the next most significant bit (i.e. the first bit not included in the truncation)

S—(sticky) the logical OR of all remaining bits that are not part of the truncation Given these three values and the truncated value, we can always compute the correctly rounded value according to the following table:

| mode | change to the truncated value |
|------|-------------------------------|
| RNE  | increment if (L&G)|(G&S)     |
| RNA  | increment if G                |
| RZ   | none                          |
| RP   | increment if positive & (G|S) |
| RM   | increment if negative & (G|S) |
| RX   | set L if G|S                  |

For example, consider multiplying two 4-bit significands, and then rounding to a 4-bit significand.
  sig1=1011 (decimal 11)
  sig2=0111 (decimal 7)
multiplying yields sig1×sig2=1001_101(decimal 77)

L Gss
The least significant bit of the truncated 4-bit result is labeled L, the next bit G, and S is the logical OR of the remaining bits labeled s (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.
Injection Rounding
A faster way to do rounding is to inject a rounding constant as part of the significand addition that is part of almost every FP operation. To see how this works, consider adding numbers in dollars and cents and then rounding to dollars. If we add $1.27
+ $2.35
  $3.62

We see that the sum $3.62 is closer to $4 than to $3, so either of the round-to-nearest modes should return $4. If we represented the numbers in binary, we could achieve the same result using the L, G, S method from the last section. But suppose we just add fifty cents and then truncate the result?

1.27
+ 2.35
+ 0.50  (rounding injection)
  4.12

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary FP this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode.

Implementing Injection Rounding

For FP, the rounding injection is one of three different values, values which depend on the rounding mode and (sometimes) the sign of the result.

Both RNA and RNE require us to inject a 1 at the G position (this is like adding $0.50 in our dollars and cents example).

RP and RM rounding depends on the sign as well as the mode. RP rounds positive results up (increases the magnitude of the significand towards positive infinity), but truncates negative results (picking the significand that is closer to positive infinity). Similarly RM rounds negative results up (increasing the magnitude of the significand toward negative infinity), but truncates positive results (picking the significand that is closer to negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in our dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

FIG. 1 schematically illustrates a data processing system 2 including a processor core 4 for performing processing operations under program control and a memory 6 for storing program instructions and data to be manipulated. The processor core 4 includes a register bank 8 for storing operands which may be in the form of fixed point values, floating point values, SIMD values, integer values, vector values or other forms. Floating point and fixed point processing circuitry 10 is coupled to the register bank 8 and serves to perform data processing operations, such as adds, subtracts, multiplies etc. upon both the fixed point values and the floating point values held within the registers of the register bank 8. The floating point and fixed point processing circuitry 10 includes circuitry for converting fixed point numbers into floating point numbers. A load store unit 12 is responsible for transferring data values between the memory 6 and the register bank 8.

FIG. 2 schematically illustrates a fixed point number. This fixed point number in the example of FIG. 2 is a 64-bit fixed point number. The most significant bits $b_{63}:b_q$ comprise an integer portion of the fixed point number. This integer portion comprises Y bits. In practice for this example, the value of Y is equal to or greater than 0 and less than 64. The least significant bits within the fixed point number $b_{q-1}:b_0$ comprise a fractional portion of the fixed point number. There are Z bits within this fractional portion where Z has a value greater than 0 and less than or equal to 64. The fixed point number contains one or more fractional bits and zero or more integer bits. The binary point position between the integer portion and the fractional portion is specified by a variable point position value fbit, which in this example 64-bit fixed point number is a 6-bit number allowing the binary point to be specified at a variable point position in the range starting from between bits $b_1$ and $b_0$ and extending to the position immediately above (to the left of) bit $b_{63}$.

FIG. 3 schematically illustrates a floating point number. As previously discussed, the floating point number includes a sign value, a fraction value and an exponent. The significand is given by adding a binary "1" to the fraction value. In the case of half precision floating point numbers, these are represented with 16-bit values. One bit is used to represent the sign. Five bits are used to represent the exponent value and accordingly the exponent has a range of 15 to −14. The fraction is represented with ten bits and accordingly the significand is an 11-bit value. The range of the exponent value in this example extends down to −14. Accordingly, it is possible that depending upon the variable binary point position within a fixed point number that is to be converted to a floating point number, when that conversion takes place the floating point number will subnormal. Subnormal numbers are ones in which the implied "1" at the start of the significand is not present and instead the leading non-zero bit within the significand occurs to the right of the decimal point position within the significand. When converting from fixed point numbers to floating point numbers in circumstances subnormal floating point numbers may be generated a problem arises in providing a rapid conversion as the shift amount to be applied to the integer portion and the fractional portion depends on whether or not the resulting floating point number will be a subnormal floating point number.

FIG. 4 schematically illustrates a portion of a fixed point number to floating point number conversion circuit which includes the ability to generate the correct shift to be applied to the input fixed point number in circumstances when the output floating point number can be subnormal. The input signals representing in two's complement form the fixed point number are received into input register 14. In this example embodiment, the input signals comprise 64 signal values representing input operand bits opa[63:0]. These input signals pass to one's complement conversion circuitry 16 which serves to convert the input signals from representing the fixed point binary number in two's complement form to one's complement form when the fixed point binary number is negative (i.e. in two's complement form the number starts with a bit value of 1). The output from one's complement conversion circuitry 16 is accordingly a fixed point number including one or more leading zero values depending upon the size of the fixed point number.

Leading zero count circuitry 18 serves to count the number of leading zeros in the fixed point binary number represented by the input signals output from the one's complement conversion circuitry 16 (irrespective of whether or not a one's complement conversion has taken place). The leading zero count circuitry generates a count of leading zeros within the integer portion followed by the fractional portion. It may be that the leading zeros terminate within the integer portion, or in the case of a small number, the leading zeros may extend so as to cover the entire integer portion and beyond the binary point position into the fractional portion. The leading zero count circuitry 18 includes two counter circuits 20, 22 which respectively produce outputs corresponding to a simple leading zero count in the case of counter 22 and leading zero count reduced by a value of one in the case of the counter 20. The count produced from the counter 20 may be achieved by passing to it the input signals output from the one's complement conversion circuitry 16 having first removed the most significant bit from the signals, i.e. having reduced any leading zero count by one. A count selector 24 serves to select as the leading zero count value to be used elsewhere within the circuitry to be either the output from the counter circuit 20 or the output from the counter circuit 22.

A negative-power detecting circuit 26 serves to detect when the input signals representing the fixed point number correspond to a fixed point number which is a negative number and a power of two as will be described further below. When the fixed point number is such a negative power of two, the count from the counter circuit 20 (i.e. the leading zero count reduced by one) is selected by the count selector 24. When the fixed point value is not a negative power of two, the count value from the counter circuit 22 is selected by the count selector 24 (i.e. the full leading zero count of the fixed point number).

The input signals from the one's complement conversion circuitry 16 are supplied as inputs to both a first shifter 28 and a second shifter 30. The first shifter 28 serves to left shift the input signals by a first shift amount which is dependent upon the count of leading zeros within the integer portion followed by the fractional portion of the fixed point number as output from the count selector 24. The first shift amount is independent of the variable point position. The output from the first shifter is a first shifted output. The second shifter 30 serves to left shift the input signals received from the one's complement conversion circuitry 16 by a second shift amount which is dependent upon the variable point position and is independent of the count of leading zeros. The second shifter 30 generates a second shifted output. More particularly, the second shift amount applied may be determined by summing "13" with the variable representing the variable point position within the fixed point number, i.e. the value fbits [5:0]. The first shifted output from the first shifter 28 and the second shifted output from the second shifter 30 are supplied as inputs to selection circuitry 32 which serves to select one of these outputs in dependence upon whether a subnormal result detector 34 has detected a combination of the variable point position and the count of leading zeros that corresponds to the result floating point number having a subnormal value. When the result floating point number has (will have) a subnormal value, then the second shifted output from the second shifter 30 is selected by the selection circuitry and passed to output register 36 to form the significand of the output floating point number. When the subnormal result detector 34 does not detect that the result floating point number will be subnormal, then the first shifted output from the first shifter 28 is selected by the selection circuitry 32 and passed to the output register 36. It will be appreciated that in practice, only a portion of the bits within the output register 36 are selected to serve as the significand within the half precision floating point number to which a conversion is being made (injection rounding is used to fit the 64-bit input into an 11-bit significand). Such a half precision floating point number has an 11-bit significand.

The bit widths of both the fixed point number and the floating point number in the example of FIG. 1 are only one example of the bit widths that may be used. In practice, the conversion may start with a fixed point number of a different bit width and target a floating point number of a different bit width. In general, if the target floating point number has a relatively limited exponent value range relative to the minimum size of value which can be represented by the fixed point value, then there arises the possibility for the output floating point number to be subnormal and accordingly the subnormal handling mechanisms of FIG. 4 become advantageous.

The negative power of two detection circuitry 26 includes an input value shifter which left shifts the input signals from the input register 14 by 1-bit position towards a most significant bit position within the input value. This left shifted input value is then subject to a bitwise inversion and has a bit value of "1" added to its least significant end. A bitwise logical combination is then applied by bitwise logical combination circuitry. The logical combination applied is a logical AND in the example of FIG. 4. In such a case, if the input signal corresponds to a floating point number which is a negative number and is a power of two, then the output from the bitwise logical combination circuitry will contain a single bit value "1" with the remaining bit values all being "0". Single bit value detecting circuitry serves to detect such a circumstance by detecting when the logical combination value contains a single instance of a predetermined bit value (in this case a predetermined bit value being "1").

More generally, it is possible in other embodiments that instead of the left shifted input value being inverted, the input value which has not been subject to the one position left shift could instead be inverted and then subject to the bitwise logical combination. In this case, when the predetermined value of which only one instance is to be detected is a "1", then the bitwise logical combination used is a bitwise NOR.

More generally, the input value shifter, the inverter, the bitwise logical combination circuitry and the single bit detecting circuitry within the negative power of two direction circuitry 26 can have a variety of different forms which perform different mathematical/logical manipulations, which all serve to generate an output which indicates when the input fixed point number represents a negative power of two. These examples include:

the left shifted input value is bitwise inverted by the inverter, the predetermined value is 0 and the bitwise logical combination is a bitwise XOR;

the left shifted input value is bitwise inverted by the inverter, the predetermined value is 1 and the bitwise logical combination is a bitwise AND;

the input value is a bitwise inverted by the inverter, the predetermined value is 0 and the bitwise logical combination is a bitwise OR; and the input value is bitwise inverted by the inverter, the predetermined value is 1 and the bitwise logical combination is a bitwise NOR.

The single bit detecting circuitry can have a variety of different possible forms which serve to detect when the logical combination value contains a single instance of a predetermined bit value (whether that be a "1" or a "0"). In the case of a single bit detecting circuit seeking to detect a single instance of the bit value of "1", then this may be provided by circuitry defined by the following signal combinations.

```
at_least_one_bit_set = logical OR of all the bits
more_than_one_bit_set = pairwise AND of 32 pairs of inputs as well
    as larger blocks of OR bits.
More precisely, given input string inp[63:0]:
or2[31:0] = inp[63:32] | inp[31:0];
or4[15:0] = or2[31:16] | or2[15:0];
or8[7:0] = or4[15:8] | or4[7:0];
or16[3:0] = or8[7:4] | or8[3:0];
or32[1:0] = or16[3:2] | or16[1:0]; or64
    = or32[1] | or32[0]
and2[31:0] = inp[63:32] & inp[31:0];
and4[15:0] = and2[31:16] & and2[15:0];
```

-continued

```
and8[7:0] = and4[15:8] & and4[7:0];
and16[3:0] = and8[7:4] & and8[3:0];
and32[1:0] = and16[3:2] & and16[1:0];
and64 = and32[1] & and32[0];
at_least_one_bit_set = or64;
more_than_one_bit_set = and64
    | (|and32[1:0])
    | (|and16[3:0])
    | (|and8[7:0])
    | (|and4[15:0])
    | (|and2[31:0]);
exactly_one_bit_set = at least one bit set & ~more_than_one_bit_set.
```

The subnormal result detector 34 is a three input add circuit which serves to add a bitwise inversion of the leading zero count value output from the count selector 24, a value of "14" and a value of (64-fbits). The carry-out from this 3-input add is ANDed with a signal indicating that the circuitry is currently performing a fixed point number to half precision floating point conversion to generate the selection signal which is supplied to the selection circuitry 32. Thus, when the circuitry of FIG. 4 is performing a fixed point number to half precision floating point number conversion and the result is detected as being subnormal, then the selection signal applied to the selection circuitry 32 serves to select the output from the second shifter 30 to form the significand of the floating point number which is to be generated, and which will be subnormal. When the subnormal result detector 34 does not detect a subnormal result, then the selection signal serves to control the selection circuitry 32 to select the output from the first shifter 28.

It will be seen from FIG. 4 that the first shifter 28, the second shifter 30 and the subnormal result detector 34 all operate at least partially in parallel within the processing stage V1.

The negative power of 2 detecting circuitry 26 may be employed within circuitry other than the fixed point number to floating point number conversion circuitry illustrated in FIG. 4. The negative power of two detection circuitry 26 can serve to perform this detecting function as a desired function in its own right or within pan of arithmetic or other circuitry in which such a detection is useful. Accordingly, the use of the negative power of two detection circuitry 6 described above is not limited to the context of fixed point number to floating point number conversions.

FIG. 5 is a flow diagram schematically illustrating operation of part of the circuitry of FIG. 4. More particularly, FIG. 5 schematically illustrates the operation of the first shifter 28, the second shifter 30, the subnormal result detector 34 and the selection circuitry 32. At step 38 the first shifter 28 shifts the input signals via an amount dependent upon the leading zero count value output from the count selector 24. At step 40 the second shifter 30 serves to shift the input signals by an amount dependent upon the variable point position (bits. At step 42, the subnormal result detector 34 serves to detect whether or not the resulting floating point number will be subnormal. In practice within the example embodiment of FIG. 4, steps 38, 40 and 42 are performed at least partially in parallel. Step 44 serves to select between one of a first shifted value generated at step 28 or a second shifted value generated at step 40 to form an output value which will be used to generate the significand of the floating point number. The selection at step 44 is controlled by the result of the subnormal result at step 42.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:

1. Apparatus for converting input signals representing a fixed point number with an integer portion, a fractional portion and a variable point position to output signals representing a floating point number having an exponent and a significand, said apparatus comprising:
   a first shifter to shift said input signals by a first shift amount dependent upon a count of leading zeros within said integer portion followed by said fractional portion and independent of said variable point position to generate a first shifted output;
   a second shifter to shift said input signals by a second shift amount dependent upon said variable point position and independent of said count of leading zeros to generate a second shifted output;
   a subnormal result detector to generate a selection signal in dependence upon detection of a combination of said variable point position and said count of leading zeros that corresponds to said floating point number having a subnormal value; and
   selection circuitry to select one of said first shifted output and said second shifted output be used to form said significand in dependence upon said selection signal.

2. Apparatus as claimed in claim 1, wherein said first shifter, said second shifter and said subnormal detector operate at least partially in parallel.

3. Apparatus as claimed in claim 1, wherein said subnormal result detector generates said selection signal as a carry out value from an add of values dependent upon said variable point position, said count of leading zeros and a minimum exponent value representable with said floating point number.

4. Apparatus as claimed in claim 3, wherein said subnormal detector is a three input adder and said count of leading zeros is bitwise inverted before said add.

5. Apparatus as claimed in claim 1, wherein said fixed point number is a fixed point binary number and said input signals represent said fixed point binary number in a two's complement form.

6. Apparatus as claimed in claim 5 comprising:
   one's complement conversion circuitry to convert, when said fixed point binary number is negative, said input signals to represent said fixed point binary number in a one's complement form; and
   leading zero count circuitry to count said number of leading zeros in said fixed point binary number represented by said input signals output from said one's complement conversion circuitry.

7. Apparatus as claimed in claim 6, comprising negative-power detecting circuitry to detect when said fixed point binary number represents a negative power of two and wherein said leading zero count circuitry reduces by one a value of said count of leading zeros supplied to said first shifter and said subnormal result detector when said fixed point binary number represents a negative power of two.

8. Apparatus as claimed in claim 7, wherein said leading zero count circuitry comprises counter circuits to determine in parallel both a first candidate count value as a count of leading zeros within said input signal and second candidate count value as a count of leading zeros within said input signal excluding a most significant bit of said converted input signal.

9. Apparatus as claimed in claim 8, comprising a count selector to select said first candidate count value when said fixed point binary number represents other than a negative power of two and to select said second candidate value when said fixed point binary number represents a negative power of two.

10. Apparatus as claimed in claim 7, wherein said negative-power detecting circuit comprises
    an input value shifter to form a left shifted input value by left shifting said input value by one bit position toward a most significant bit position of said input value;
    an inverter to bitwise invert one of said input value and said left shifted input value to generate an inverted value;
    bitwise logical combination circuitry to perform a logical combination corresponding to a bitwise logical combination of another of said input value and said left shifted input value with said inverted value to generate a logical combination value; and
    single bit detecting circuitry to detect said input value as representing a negative power of two when said logical combination value contains a single instance of a predetermined bit value.

11. Apparatus as claimed in claim 10, wherein said bitwise logical combination circuitry generates an output bit having said predetermined bit value when corresponding bit values within said input value and said left shifted input value have a same value.

12. Apparatus as claimed in claim 11, wherein one of:
    said left shifted input value is bitwise inverted by said inverter, said predetermined value is zero and said bitwise logical combination is a bitwise XOR;
    said left shifted input value is bitwise inverted by said inverter, said predetermined value is one and said bitwise logical combination is a bitwise AND;
    said input value is bitwise inverted by said inverter, said predetermined value is zero and said bitwise logical combination is a bitwise OR; and
    said input value is bitwise inverted by said inverter, said predetermined value is one and said bitwise logical combination is a bitwise NOR.

13. Apparatus as claimed in claim 1, wherein a minimum value representable with said input signals as said fixed point number is less than a minimum value representable with said output signals as said floating point number.

14. Apparatus as claimed in claim 1, wherein said fixed point number is a 64-bit fixed point number and said floating point number is a half precision floating point number.

15. Apparatus as claimed in claim 1, wherein said input signal represent an X bit fixed point binary number, said integer portion has Y bits, said fractional portion has Z bits, $X=Y+Z$, $0=<Y<X$ and $0<Z=<X$.

* * * * *